M. WORKMAN.
Feed Rack.
No. 79,886.
Patented July 14, 1868.
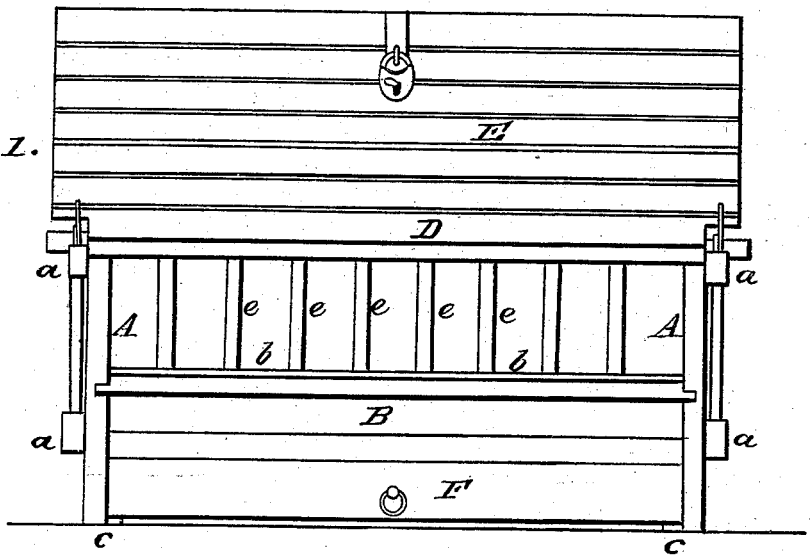
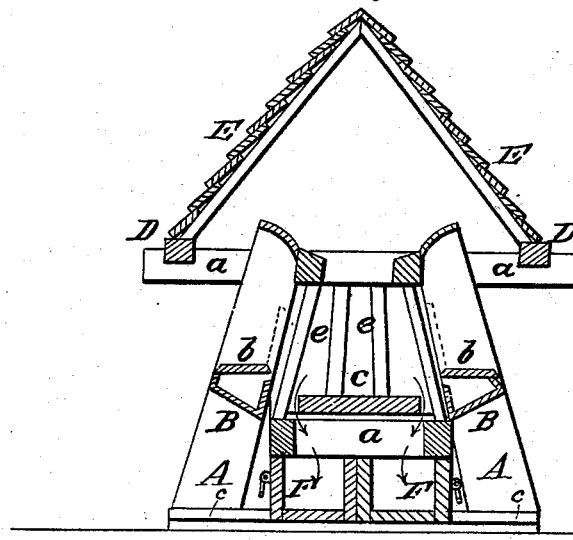

United States Patent Office.

MORGAN WORKMAN, OF WASHINGTON TOWNSHIP, OHIO.

Letters Patent No. 79,886, dated July 14, 1868.

IMPROVEMENT IN FEED-RACKS.

*The Schedule referred to in these Letters Patent and making part of the same.*

TO ALL WHOM IT MAY CONCERN:

Be it known that I, MORGAN WORKMAN, of the township of Washington, in the county of Holmes, and State of Ohio, have invented a new and useful Improvement in Feed-Racks; and I do hereby declare that the following is a full, clear, and exact description of the construction and operation of the same, reference being had to the accompanying drawings, making a part of this specification, in which—

Figure 1 is a side elevation.

Figure 2 is a transverse section, as indicated by the line $x\,y$ of fig. 1.

Like letters, in both figures of the drawings, indicate like parts.

My invention relates to an improved method of constructing portable feed-racks, which is especially adapted to the cleanly and economical feeding of sheep.

It consists,

First, of removable feed-troughs, hinged covers, which are designed for the exclusion of filth by closing the same when the cattle are not being fed therefrom; which troughs are tongued loosely but snugly in grooves, which grooves form an inclined plane in the main standards of the feed-rack, and which are thus attached to the rack for the purpose of facilitating the removal thereof.

Second, in so hinging the cover to said trough as to cause it to subserve the double purpose of a cover, for cleanliness, and as a means of excluding the cattle, during the feeding thereof, from withdrawing from the rack other food than that placed in the trough for their consumption.

Third, in so combining, with the feed-rack, drawers, which are so adjusted below and partially underneath the aforesaid troughs, as to catch the grass-seed which falls from the mouths of the cattle while feeding, and which drawers have perforations in the bottom thereof for the prevention of dampness therein.

To enable any one skilled in the art to make and use my invention, I will proceed to describe its construction and operation.

A represents the standards, upon which the structure is built, which rests upon and is braced by the transverse timbers $a$.

B represents the removable feed-troughs, which are slid into suitable grooves formed in the standards, the grooves forming an inclined plane, descending from the exterior towards the interior thereof. $b$ are the hinged covers.

C represents the interior of the rack, or the receptacle in which is stored the food of the cattle.

D represents two horizontal pieces of timber, which are rigidly attached, one to each lateral end of the rack, and upon which rests the roof thereof, the said pieces having a suitable concavity formed therein for the reception of the longitudinal pieces composing the base of the roof.

E represents a weather-boarded roof, having longitudinal beams attached thereto, the extremities of which are rounded off and fit into the aforesaid concave receptacles formed in the horizontal timbers. The roof is composed of two pieces, hinged at the eaves thereof, and fastened at the top by a padlock and staple. A wire at each end of said longitudinal pieces is passed over the same, and through vertical apertures in the timbers supporting the roof, and then and there tied, whereby the roof is hinged, and which roof, when opened, allows the feed to be deposited in the receptacle C.

F represents the drawers of the rack, a drawer being on each side thereof and immediately under the troughs, which drawers rest and are slid in and out on cleats $c$, attached to the inner sides of the bottom transverse base-bars of the rack, the arrows of fig. 2 indicating the direction of the seed in passing into the drawers from the bottom plate $d$ of the feed-receptacle C.

The hinged covers are represented as raised up in red lines, and lie against the bars $e$ of the rack, for the purpose as aforesaid.

Having thus fully described my invention, what I claim therein as new, and desire to secure by Letters Patent, is—

In the construction of a feed-rack, the arrangement of the removable troughs B, and hinged covers $b$, substantially in the manner and for the purpose as herein shown and described.

As evidence that I claim the foregoing, I have hereunto set my hand in the presence of two witnesses.

MORGAN WORKMAN.

Witnesses:
WILLIAM P. WORKMAN,
JOHN STRONG.